Nov. 12, 1940.                    T. L. WILSON                    2,220,985
                    CLASSIFICATION OF MIXED DIVIDED MATERIAL
                              Filed Oct. 1, 1938
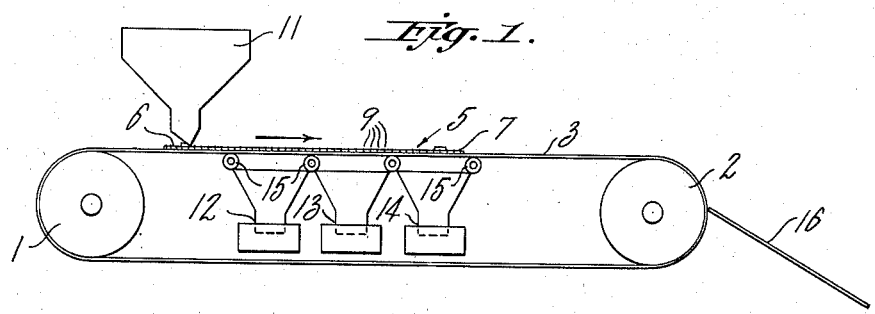
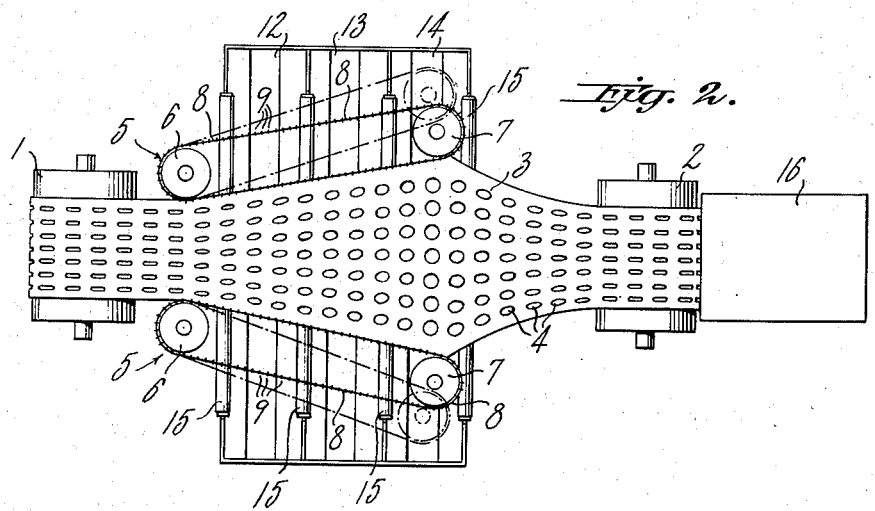
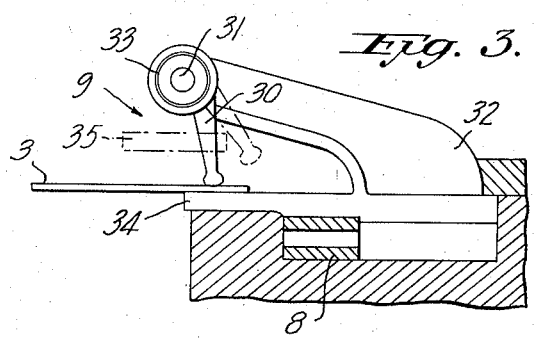
INVENTOR.
THOMAS L. WILSON
BY Gourley & Furlong
ATTORNEYS Patented Nov. 12, 1940

2,220,985

UNITED STATES PATENT OFFICE 2,220,985

CLASSIFICATION OF MIXED DIVIDED MATERIAL

Thomas Lee Wilson, Upper Montclair, N. J., assignor, by mesne assignments, to United States Rubber Company, New York, N. Y., a corporation of New Jersey Application October 1, 1938, Serial No. 232,785

6 Claims. (Cl. 209—84)

This invention relates to methods and apparatus for classifying mixed divided material, and more particularly for separating material comprising particles of divergent sizes into groups of particles each having a desired average particle size.

Mixtures or suspensions of comminuted material having varying particle sizes are commonly separated or classified into groups according to size by first sifting or filtering the material through a sieve or filter medium having a mesh or openings of given dimensions. This process divides the original mixture into two groups, the particles in one group being of greater dimensions than the openings in the filter medium, and those in the other being of smaller size. In order to further classify the smaller particles, the sifted mixture is again passed through a screen or filter medium having a finer mesh than the first. The process is repeated in that manner step by step until the desired number of groups of particles, each having the desired average particle size, are separated from each other. This procedure necessitates the use of a plurality of filter media or screens, and requires repetition of the process each time a different class or group is desired.

Current practice also includes the classification of mixed divided material by passing it over a series of screens or filter media. The first of the media has comparatively small openings and the size of the openings in each successive screen is greater than that of the screen preceding it, particles of different average size being separated by each of the individual screens. When it is desired to change the gradations of particles classified by apparatus of this type, it is necessary to substitute screens having different meshes.

The present invention provides methods and apparatus for classifying mixed divided or comminuted material into the desired number of groups according to the desired average particle size. The method is continuous, and the average particle size of each group of particles may be determined or changed by an adjustment of the apparatus without the necessity of substituting a different filter medium. The present process and apparatus are adapted for the sifting of materials in the dry state as well as the filtering of suspended materials, and consequently the terms "sifting" and "filtering" as used herein have interchangeable significance.

According to the present invention, comminuted material to be classified into the desired average particle sizes is deposited onto an elastic sheet having openings therein. The elastic sheet is preferably a vulcanized perforate rubber sheet in which the perforations are of similar size and shape when the sheet is in a relaxed condition. The elastic sheet is then gradually stretched to progressively enlarge the perforations, and as the perforations are enlarged, portions of the deposited material are sifted through the perforations. As the sifted particles pass through the sheet they are collected in groups at desired intervals, so that each group has a particular desired average size. For example, the comminuted material may be placed on a longitudinally travelling perforate elastic belt and during its course of travel the belt may be gradually stretched laterally. At the beginning of the stretch, the perforations become enlarged only slightly, but as the belt during its course of travel is stretched to a greater degree, the perforations assume generally proportionately greater dimensions. The particles which sift through the belt at the beginning of this gradual progressive stretching are necessarily limited in size by the minimum dimensions of the perforations, and are collected in a group having a relatively small mean size. As the belt progresses and is stretched to an intermediate degree, particles of intermediate size are permitted to pass through and become sifted into a group having an intermediate and relatively larger average dimensional limit. By the time the belt has arrived at the position where it is given the maximum stretch, the perforations likewise shall have attained their maximum diameter and a still larger group of particles will be sifted through.

In the example just referred to, in which the perforations are enlarged as the belt travels, the intervals at which the desired groups of similarly sized particles are collected may be space intervals. For the collection of the groups of particles, a series of fixed receptacles may be adjacently placed below the portion of the belt where the stretching and selection of the particles takes place. The invention, however, also contemplates the selection of similarly sized groups of particles at time intervals. For example, a fixed elastic sheet having similar openings arranged therein may be gradually stretched over a period of time, during which period of time particles of constantly increasing size may be sifted therethrough. In this case, an initial receptacle placed under the sheet to catch the smallest particles may be replaced successively by other receptacles, each of which in turn will catch particles of increasingly greater size.

Referring to the accompanying drawing, a present preferred illustrative embodiment of the invention is diagrammatically illustrated in which:

Fig. 1 is an elevational view of continuous apparatus for classifying comminuted material, Fig. 2 is a plan view of the apparatus illustrated in Fig. 1, and Fig. 3 is an elevational view of a clamp and release mechanism.

The elastic sheet material employed in the present invention as a sifting or filtering medium may conveniently comprise vulcanized rubber, although rubber substitutes or other elastic sheet compositions may be successfully used. The desired number of perforations or openings in the sheet, sieve, or filtering material may be produced in known manner and their original shape and size may be selected according to the character of the material to be separated. Preferably, and particularly in the case of a travelling belt, the perforations are elongated so that their major axes lie in the direction of travel of the belt. For this purpose, slits or elliptical openings have been found satisfactory. A convenient method of producing rubber sheet material having elongated openings is to produce a perforate sheet according to the specification of United States Letters Patent 2,032,942, which material initially has uniform openings generally of circular configuration, the range of average diameters being from 0.01 to 0.2 millimeter. The circular perforations in this sheet material may be rendered generally elliptical by forming it into a belt and stretching it between rollers so that the longitudinal diameters become elongated, which elongation is usually accompanied by a reduction in the transverse diameter. Another method of treating this material to produce elongated openings is by first stretching the unvulcanized material in one direction and vulcanizing it in that condition to set the shape of the perforations, as described in U. S. Letters Patent 2,079,584. Other methods of producing the desired uniform perforations in the sheet will occur to those skilled in the art, such as by slitting or punching ordinary sheet rubber. In practicing certain embodiments of the invention circular perforations are found satisfactory, for example when the sheet material is stretched in more than one direction in order to enlarge the perforations.

Referring to the particular embodiment of the invention illustrated in the drawing, a pair of rolls 1 and 2 support an endless elastic belt 3 having perforations 4 and are driven by means (not shown) to cause the belt to travel in the direction of the arrow. The perforations 4 as diagrammatically illustrated in Fig. 2 are greatly enlarged to depict their change in size and shape as the belt is laterally stretched. When filtering or sifting finely divided material to classify it, a belt is selected which has a great number of small perforations closely arranged with respect to one another. On either side of the upper reach of the belt a tentering mechanism 5 is angularly positioned with respect to the line of travel of the belt. The tentering mechanism 5 may be of any desired conventional type, for example, as disclosed in the aforesaid U. S. Patent 2,079,584, which is diagrammatically illustrated here for the sake of convenience as comprising a pair of sprockets 6 and 7 driving a chain 8, on which a series of clamps 9 are mounted for engagement with the edge of the belt 3. Each clamp 9, as shown in Fig. 3, comprises a finger 30 pivoted at 31 on an arm 32. A spring 33 at the pivot 31 tends to press the end of the finger 30 against the clamp base 34 which is carried by the chain 8. When the edge of the material 3 is gripped in the clamp 9, it will be seen the harder the pull of the material, the tighter it is held by the clamp. A cam 35 operates as a release mechanism for the clamp 9 as it reaches the sprocket 7 by pressing against the finger 30 as indicated in the dotted lines in Fig. 3. In the usual manner, as each clamp 9 travels around the sprocket 6 into engagement with the edge of the belt, it tightens on the belt and carries the belt toward the perimeter of the sprocket 7. Upon reaching the sprocket 7 the clamp 9 is dis-engaged by the release mechanism and returns to the sprocket 6 to re-engage an oncoming unstretched portion of the travelling belt. Above the belt a hopper 11 is arranged to feed comminuted material onto the upper surface of the belt. The desired number of receptacles or bins 12, 13 and 14 are adjacently placed immediately below the upper reach of the belt 3 so that the forward edge of the bin 12 corresponds with the least stretched portion of the belt and the rearward edge of the bin 14 corresponds with the portions of the belt having the greatest degree of stretch. Above the edges of the bins and transverse to the belt are positioned a series of rollers 15 on which the belt may travel as it is stretched. A scraper knife 16 engages the outer edge of the belt at the roll 2 for the removal of material which has not fallen through the belt. Fig. 2 illustrates in dotted lines an alternative position of the sprockets 7, in which the angle of the tentering mechanism and the consequent ultimate stretch are increased.

In operation, the belt 3 is driven in the direction indicated by the arrow, and the sprockets 6 and 7 are driven at a corresponding speed to drive the chain 8 at such speed that its component in the direction of the arrow is equal to the speed of the belt 3. As each two corresponding clamps 9 grip the opposite edges of the belt 3, they progressively stretch the belt transversely of its direction of travel, until they are released at the sprocket 7. Consequently, the elongated perforations 4 over the bin 12 have a comparatively small average lateral dimension. The perforations travelling over the intermediate bin 13 have progressively larger lateral axes and finally the perforations travelling over the rearmost bin 14 are practically circular since their original smaller dimension is increased to substantially equal the dimension of their original longest axis. In order to separate material having particles of divergent sizes, the material is fed through the hopper 11 onto the upper surface of the belt, and is drawn over the bin 12. It is preferable to agitate or oscillate the belt within its zone of stretch in order to facilitate sifting or filtering, that is, to assist the force of gravity in withdrawing particles through the perforations. The smallest particles are shaken through the smallest perforations and into the bin 12; larger particles pass through the intermediately enlarged perforations into the bin 13; and finally the still larger particles are classified by dropping through the largest perforations into the bin 14. Unclassified particles, that is, those of a size greater than the largest perforations, are removed from the surface of the belt by the scraper knife 16.

When separating comminuted particles of dry non-conductive material, electrostatic charges may accumulate thereon and tend to retard the passage of particles of the proper size through the perforation. In order to obviate this, it may be desirable to conductively ground the rollers 15, to neutralize the accumulated electrostatic charges.

The maximum degree of stretch imparted to the belt may be varied by moving the sprockets 7 closer to or farther away from the belt. A different position of the sprocket 7, and hence of the chain 8 and the clamps 9, is indicated in dotted lines in Fig. 2. In the position illustrated by the dotted lines, the particles permitted to fall into the bin 14 will obviously be greater in size than those collected therein when the tentering mechanism was in its original position.

While a certain present preferred embodiment of the invention has been shown and described in some detail, it is to be understood that the invention may be otherwise embodied within the spirit thereof and within the scope of the appended claims.

Having thus described my invention, what I claim and desire to protect by Letters Patent is:

1. The method of classifying comminuted material having various particle sizes which comprises depositing the material onto an elastic sheet having perforations therein, gradually stretching the sheet to progressively enlarge said perforations, sifting deposited material through said perforations as the perforations become enlarged, and collecting groups of sifted particles at desired intervals during the enlargement of said perforations.

2. The method of classifying comminuted material having various particle sizes which comprises depositing the material onto a travelling elastic belt having perforations therein, gradually stretching the belt transversely of its direction of travel thereby progressively enlarging the perforations, sifting deposited material through the perforations as the perforations become enlarged, and separately collecting groups of sifted particles of desired average sizes after they pass through perforations corresponding to those sizes.

3. Apparatus for classifying comminuted material having various particle sizes which comprises an elastic sheet having perforations therein, means for gradually stretching the elastic sheet to progressively enlarge the perforations therein to the desired sizes, and receptacles associated below various groups of perforations of desired mean sizes for separately collecting material of various maximum particle sizes after the particles have sifted through said perforations of the desired sizes.

4. Apparatus for classifying comminuted material having various particle sizes which comprises a belt of elastic sheet having perforations therein, means for driving the belt, means for gradually stretching the belt transversely of the direction of travel of the belt to progressively enlarge said perforations, and means for collecting at desired intervals material which has sifted through said perforations.

5. Apparatus for classifying comminuted material having various particle sizes which comprises a belt of elastic sheet having elongated openings therein extending in the direction of travel of the belt, means for driving the belt, means for gradually stretching the belt transversely of its direction of travel to progressively enlarge the lesser dimensions of said openings, and means for separately collecting at desired intervals material which has sifted through said perforations.

6. Apparatus for classifying comminuted material having various particle sizes which comprises supporting rolls, an endless elastic belt supported by said rolls, means for driving the belt, said belt having longitudinal openings therein extending in the line of travel thereof, means for stretching the belt transversely of the line of travel thereof to enlarge said openings to progressively greater sizes of the desired dimensions, and collecting means associated at intervals with said openings during their enlargement.

THOMAS LEE WILSON.